United States Patent
Zhang et al.

(10) Patent No.: US 10,291,418 B2
(45) Date of Patent: May 14, 2019

(54) FILE SIZE-BASED TOLL-FREE DATA SERVICE

(71) Applicant: Verizon Patent and Licensing Inc., Arlington, VA (US)

(72) Inventors: Gong Zhang, Waltham, MA (US); Jian Huang, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 258 days.

(21) Appl. No.: 14/974,796

(22) Filed: Dec. 18, 2015

(65) Prior Publication Data

US 2017/0180143 A1    Jun. 22, 2017

(51) Int. Cl.
| | | |
|---|---|---|
| H04L 12/14 | (2006.01) | |
| H04L 29/08 | (2006.01) | |
| G06F 17/30 | (2006.01) | |
| G06F 16/901 | (2019.01) | |

(52) U.S. Cl.
CPC ...... H04L 12/1496 (2013.01); G06F 16/9014 (2019.01); G06F 17/30949 (2013.01); H04L 12/1435 (2013.01); H04L 67/02 (2013.01); H04L 67/141 (2013.01); H04L 67/146 (2013.01); H04L 69/329 (2013.01)

(58) Field of Classification Search
CPC .. G06F 17/30949; G06Q 30/00; G06Q 30/02; G06Q 30/0254; G06Q 50/10; H04L 12/1407; H04L 12/1435; H04L 12/1446; H04L 12/1475; H04L 12/1485; H04L 12/1496; H04L 41/50; H04L 41/0893; H04L 41/5003; H04L 43/028; H04L 63/029; H04L 63/0281; H04L 63/0815; H04L 65/60; H04L 65/403; H04L 65/4084; H04L 67/02; H04L 67/06; H04L 67/141; H04L 67/146; H04M 15/00; H04M 15/09; H04M 15/41; H04M 15/43; H04M 15/58; H04M 15/80; H04M 2215/0188; H04M 2215/019; H04W 4/003; H04W 4/24; H04W 4/26
See application file for complete search history.

(56) References Cited

U.S. PATENT DOCUMENTS

| | | | | |
|---|---|---|---|---|
| 8,843,997 | B1 * | 9/2014 | Hare | H04L 63/0281 709/200 |
| 2010/0082431 | A1 * | 4/2010 | Ramer | G06Q 30/02 705/14.52 |
| 2012/0221955 | A1 * | 8/2012 | Raleigh | H04M 15/00 715/736 |
| 2014/0120867 | A1 * | 5/2014 | Hodges | G06Q 30/00 455/406 |

(Continued)

*Primary Examiner* — Clayton R Williams
*Assistant Examiner* — Michael Li (57) ABSTRACT

A device may receive hash values generated based on resource identifiers. The resource identifiers may be associated with a toll free data service and may be associated with a file size threshold for accessing the toll-free data service. The device may identify a request to access content using a resource identifier and may generate a hash value based on the resource identifier. The device may compare the generated hash value and the received hash values. The device may request the content selectively using a toll-free resource identifier or a non-toll-free resource identifier based on comparing the generated hash value and the received hash values.

20 Claims, 6 Drawing Sheets

(56) References Cited

U.S. PATENT DOCUMENTS

| | | | |
|---|---|---|---|
| 2014/0173077 A1* | 6/2014 | Newton | H04L 41/0893 709/223 |
| 2015/0067819 A1* | 3/2015 | Shribman | H04L 67/06 726/12 |
| 2017/0006451 A1* | 1/2017 | Mandanapu | H04L 43/028 |

* cited by examiner

FILE SIZE-BASED TOLL-FREE DATA SERVICE

BACKGROUND

Service providers, such as online media companies, may wish to deliver content to network users. Some service providers may choose to subsidize the cost of network data usage which would otherwise be paid by the network users accessing the content.

DETAILED DESCRIPTION OF PREFERRED EMBODIMENTS

The following detailed description of example implementations refers to the accompanying drawings. The same reference numbers in different drawings may identify the same or similar elements.

A content provider may want to provide content (e.g., streaming media (e.g., video or audio), a webpage, a document, an image, or the like) to a network user. The content provider may want to subsidize the cost of network data usage associated with the content, which would ordinarily be charged to the network user. A network operator may want to ensure that network data usage is charged to the appropriate party (e.g., either the content provider or the network user). One way to ensure appropriate charges is to convert a non-toll free resource identifier (e.g., a uniform resource identifier, such as a uniform resource locator (URL)) for a resource to a toll-free resource identifier. If the non-toll free resource identifier is used to access the resource, then the network operator may charge the network user for network data usage. If the toll-free resource identifier is used to access the resource, then the network operator may charge the content provider for network data usage.

A mobile device may access content using a request, such as a hypertext transfer protocol (HTTP) request. However, the content (e.g., streaming media, a webpage, etc.) may be associated with multiple files that may each have a unique resource identifier. Additionally, each file associated with the content may have a different file size (e.g., a quantity of bytes). When a mobile device requests content associated with multiple files, the mobile device may send a quantity of HTTP requests that corresponds to the quantity of files associated with the content. Therefore, if the network data usage associated with the content is to be charged to the content provider, then toll-free resource identifiers for each file may need to be generated.

For example, if particular content (e.g., a webpage) is associated with several (e.g., 100) small files (e.g., less than 5 megabytes (MB)) and one large file (e.g., greater than 1 gigabyte), then 101 HTTP requests may need to be processed and/or 101 toll-free resource identifiers may need to be generated. Generating multiple toll-free resource identifiers may be inefficient and may introduce latency as resource identifiers are being generated and/or validated. Additionally, generating a toll-free resource identifier associated with a small file may consume the same quantity of network, processor, and/or memory resources as generating a toll-free resource identifier associated with a large file.

Implementations described herein may allow a mobile device to request toll-free resource identifiers associated with files having file sizes that satisfy a particular threshold. Implementations described herein may reduce the quantity of toll-free resource identifiers that need to be generated and/or validated, thereby conserving network, processor, and memory resources. Further, implementations described herein may allow a mobile device to request files, having file sizes that do not satisfy the threshold, using a non-toll-free resource identifier, thereby reducing latency and conserving network resources.

Figure 1A:
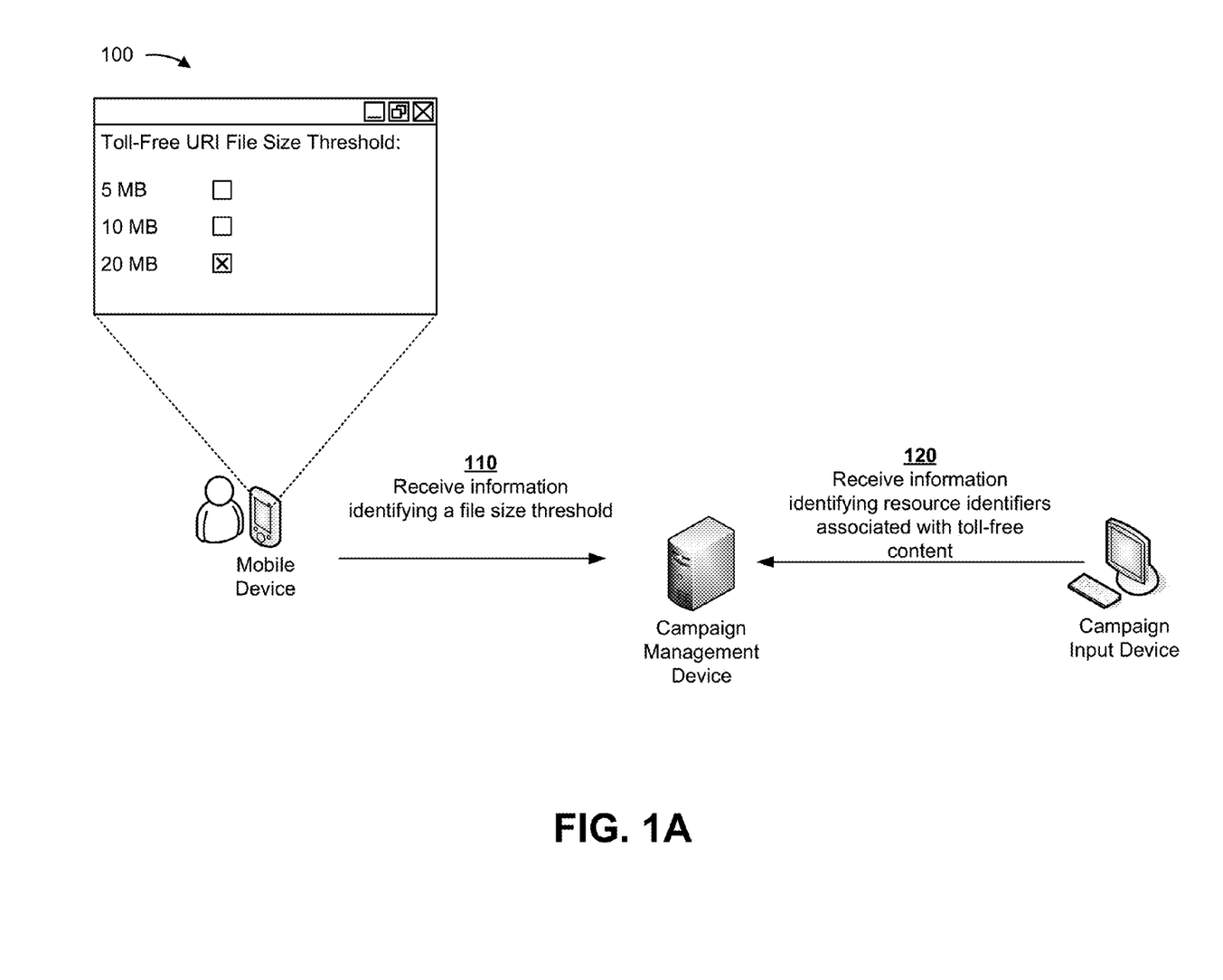
FIGS. 1A-1C are diagrams of an overview of an example implementation described herein.
Figure 1B:
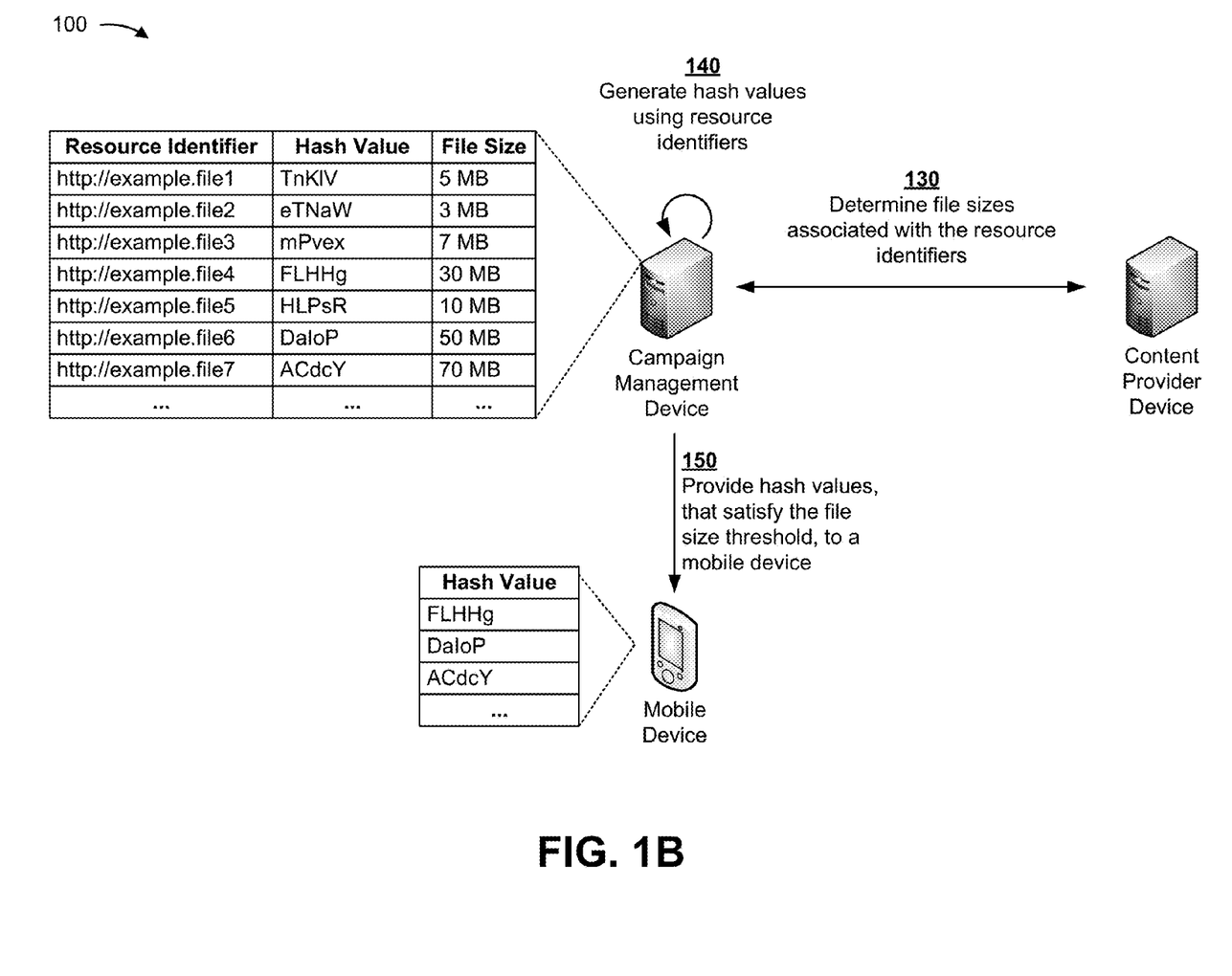
Figure 1C:
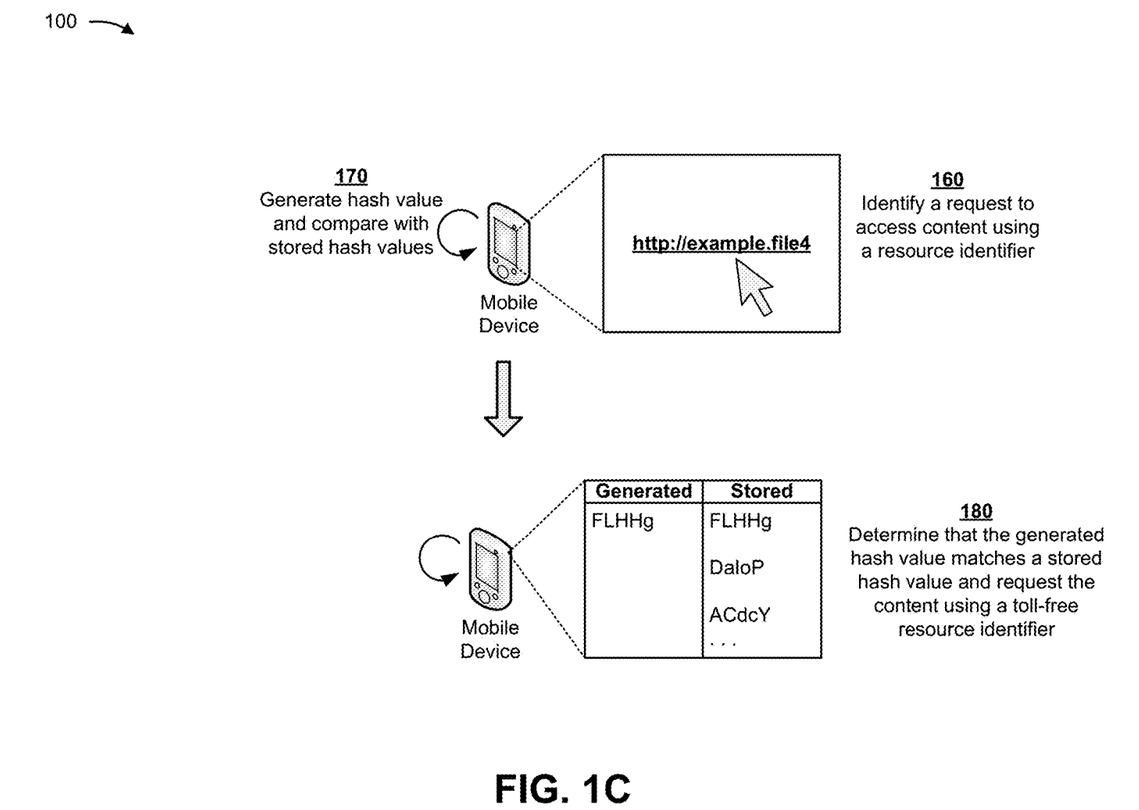

FIGS. 1A-1C are diagrams of an overview of an example implementation 100 described herein. As shown in FIG. 1A, a user may specify a file size threshold for requesting a toll-free resource identifier (e.g., a uniform resource identifier (URI), a uniform resource locator (URL), or the like). For example, as shown, assume that the user selects (e.g., via a user interface of a mobile device) twenty megabytes as the file size threshold. The mobile device may request toll-free resource identifiers for files having a file size greater than the file size threshold (e.g., 20 MB), for example. As shown by reference number 110, a campaign management device may receive, from the mobile device, information identifying the file size threshold. In some implementations, the campaign management device may be configured with the file size threshold (e.g., a network operator may configure the file size threshold).

Additionally, as shown by reference number 120, the campaign management device may receive, from a campaign input device, information identifying resource identifiers associated with toll-free content. For example, a content provider may provide, via the campaign input device, the campaign management device with a list of resource identifiers. For example, assume that content identified by the resource identifiers is a toll-free resource and that network data usage associated with the toll-free resource will be charged to the content provider.

As shown in FIG. 1B, and by reference number 130, the campaign management device may determine file sizes associated with the resource identifiers. For example, the campaign management device may determine a location of a file identified by a resource identifier (e.g., stored via a content provider device). For each resource identifier that campaign management device receives from the campaign input device, the campaign management device may determine a file size and may store the file size, for example.

As shown by reference number 140, the campaign management device may generate hash values using the resource identifiers. For example, the campaign management device may apply a hash algorithm to the resource identifiers to generate hash values. As shown by reference number 150, the campaign management device may provide the hash values, that are associated with files that satisfy the file size threshold (e.g., greater than 20 MB) to a mobile device.

As shown in FIG. 1C, and by reference number 160, the mobile device may identify a request to access content using a resource identifier (e.g., shown as "http://example.file4"). The mobile device may identify the request based on a user interaction with the mobile device (e.g., based on a user "clicking" the resource identifier). As shown by reference number 170, the mobile device may generate a hash value using the resource identifier and a same hash algorithm applied by the campaign management device, and may compare the hash value with the list of hash values received from the campaign management device.

As shown by reference number 180, the mobile device may determine that the generated hash value matches a stored hash value and may request the content using a toll-free resource identifier based on the generated hash value matching the stored hash value. For example, based on determining that the hash value and a stored hash value include the same value, the mobile device may determine that the resource identifier is associated with a file that satisfies the file size threshold (e.g., is larger than 20 MB). In this way, the mobile device may request the file using a toll-free resource identifier. For example, the mobile device may provide the resource identifier to another device that may generate a toll-free resource identifier.

In this way, the mobile device may determine whether resource identifiers are associated with files that satisfy a file size threshold based on comparing generated hash values with received hash values. Implementations described herein may reduce the quantity of toll-free resource identifiers that may need to be generated and/or validated to access content associated with a toll-free data service, thereby conserving network, processor, and/or memory resources.

As indicated above, FIGS. 1A-1C are provided merely as an example. Other examples are possible and may differ from what was described with regard to FIGS. 1A-1C.

Implementations described herein may assist a mobile device in determining whether to request content using a toll-free resource identifier or a non-toll-free resource identifier based on a file size threshold. Implementations described herein may reduce a quantity of resource identifiers that are required to be generated and/or validated to access content associated with a toll-free data service, thereby conserving network, processor, and/or memory resources. Additionally, implementations described herein may improve a rate of content delivery to a mobile device. For example, by allowing a mobile device to request content using non-toll-free resource identifiers for files associated with file sizes that do not satisfy a file size threshold, implementations described herein may conserve network, processor, and/or memory resources.

Figure 2:
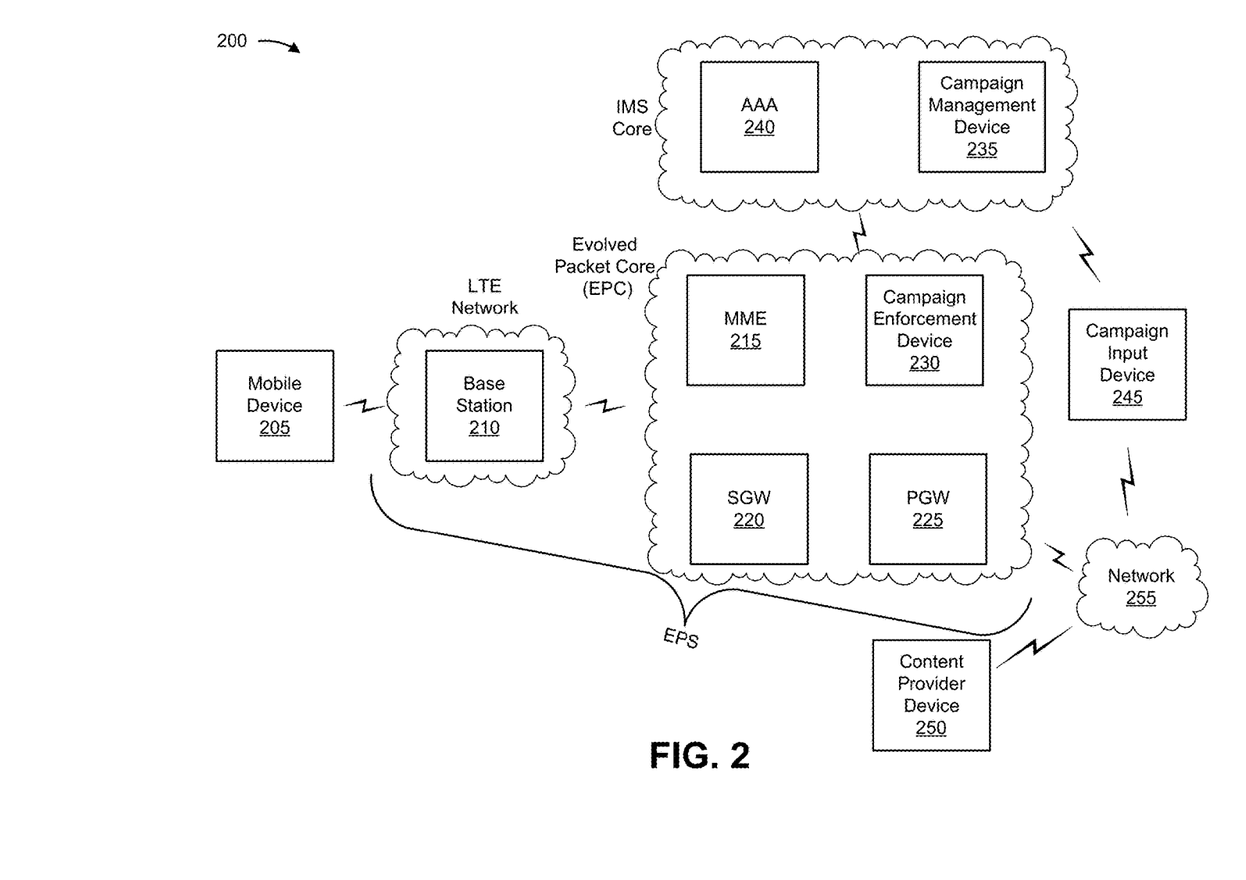
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a campaign enforcement device 230; a campaign management device 235; an authentication, authorization, and accounting server (AAA) 240; a campaign input device 245; a content provider device 250; and a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network or a code division multiple access (CDMA) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and/or campaign enforcement device 230 that enable mobile devices 205 to communicate with network 255 and/or an Internet protocol (IP) multimedia subsystem (IMS) core. The IMS core may include campaign management device 235 and/or AAA 240, and may manage device registration and authentication, session initiation, campaign information, etc., associated with mobile devices 205 and/or content provider devices 250. Campaign management device 235 and/or AAA 240 may reside in the EPC and/or the IMS core.

Mobile device 205 may include one or more devices capable of communicating with base station 210 and/or a network (e.g., network 255). Mobile device 205 may include one or more devices capable of receiving, generating, storing, processing, and/or providing information. For example, mobile device 205 may include a computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, mobile device 205 may be associated with an account that is charged based on network data usage by mobile device 205. Mobile device 205 may send traffic to and/or receive traffic from network 255 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 255 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more servers, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 255 (e.g., via PGW 225) and/or other network devices associated with the EPC and/or the IMS core. SGW 220 may also receive traffic from network 255 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255, and may send the traffic to mobile device 205 via SGW 220 and base station 210. PGW 225 may record data usage information (e.g., byte usage), and may provide the data usage information to AAA 240.

Campaign enforcement device 230 may include one or more devices capable of receiving, processing, storing, generating, and/or providing information associated with toll-free data services. For example, campaign enforcement device 230 may include a gateway, a router, a modem, a switch, a firewall, a NIC, a hub, a bridge, a server device, an OADM, or a similar device. Campaign enforcement device 230 may receive information associated with a toll-free campaign from campaign management device 235, may apply the information to traffic received from PGW 225, and may instruct PGW 225 how to handle the traffic based on information received from campaign management device 235. Additionally, or alternatively, campaign enforcement device 230 may instruct AAA 240 how to charge for data usage associated with the traffic. Different campaign enforcement devices 230 may be associated with different geographic regions and/or cellular service areas, in some implementations.

In some implementations, campaign enforcement device 230 may receive information about registering a resource identifier, from campaign input device 245, associated with particular content. Additionally, or alternatively, campaign enforcement device 230 may generate a signature based on the information about registering the resource identifier, and may provide a toll-free resource identifier to mobile device 205. In some implementations, campaign enforcement device 230 may receive a validation request, from mobile device 205, which includes the resource identifier. Additionally, or alternatively, campaign enforcement device 230 may send the signature to mobile device 205 when the validation request is received.

Campaign management device 235 may include one or more devices capable of receiving, generating, storing, processing, and/or providing information associated with a toll-free data service campaign (e.g., campaign information, etc.). For example, campaign management device 235 may include a server device or a similar device. Campaign management device 235 may receive campaign information from campaign input device 245 (e.g., one or more resource identifiers associated with the campaign, a storage location of one or more files associated with the resource identifiers, etc.), may generate campaign rules based on the campaign information, and may deploy the campaign rules to one or more campaign enforcement devices 230 (e.g., associated with one or more cellular service areas).

In some implementations, campaign management device 235 may determine a location (e.g., associated with a storage component of one or more content provider devices 250) of one or more files associated with resource identifiers received from campaign input device 245. In some implementations, campaign management device 235 may determine file sizes associated with the resource identifiers, may generate hash values based on the resource identifiers, etc.

AAA 240 may include one or more devices, such as one or more server devices, that perform authentication, authorization, and/or accounting operations for communication sessions associated with mobile device 205. For example, AAA 240 may store data usage information for mobile device 205, for a user associated with mobile device 205, for content provider device 250, for a content provider (e.g., that provides a toll-free data service), etc.

Campaign input device 245 may include one or more devices capable of receiving, generating, storing, processing, and/or providing information associated with a toll-free data service campaign. For example, campaign input device 245 may include a desktop computer, a laptop computer, a mobile phone, a server device, or a similar device. Campaign input device 245 may receive input, from a content provider, that identifies campaign information, and may provide the campaign information to campaign management device 235. In some implementations, a content provider may input, via campaign input device 245, one or more resource identifiers to access content associated with the campaign.

Content provider device 250 may include one or more devices capable of providing content (e.g., to mobile device 205). For example, content provider device 250 may include a server device (e.g., a host server, a web server, an application server, etc.) or a similar device. Content provider device 250 may be associated with a content provider that provides a toll-free data service, where the content provider is charged for data usage rather than an end user associated with mobile device 205.

Network 255 may include one or more wired and/or wireless networks. For example, network 255 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
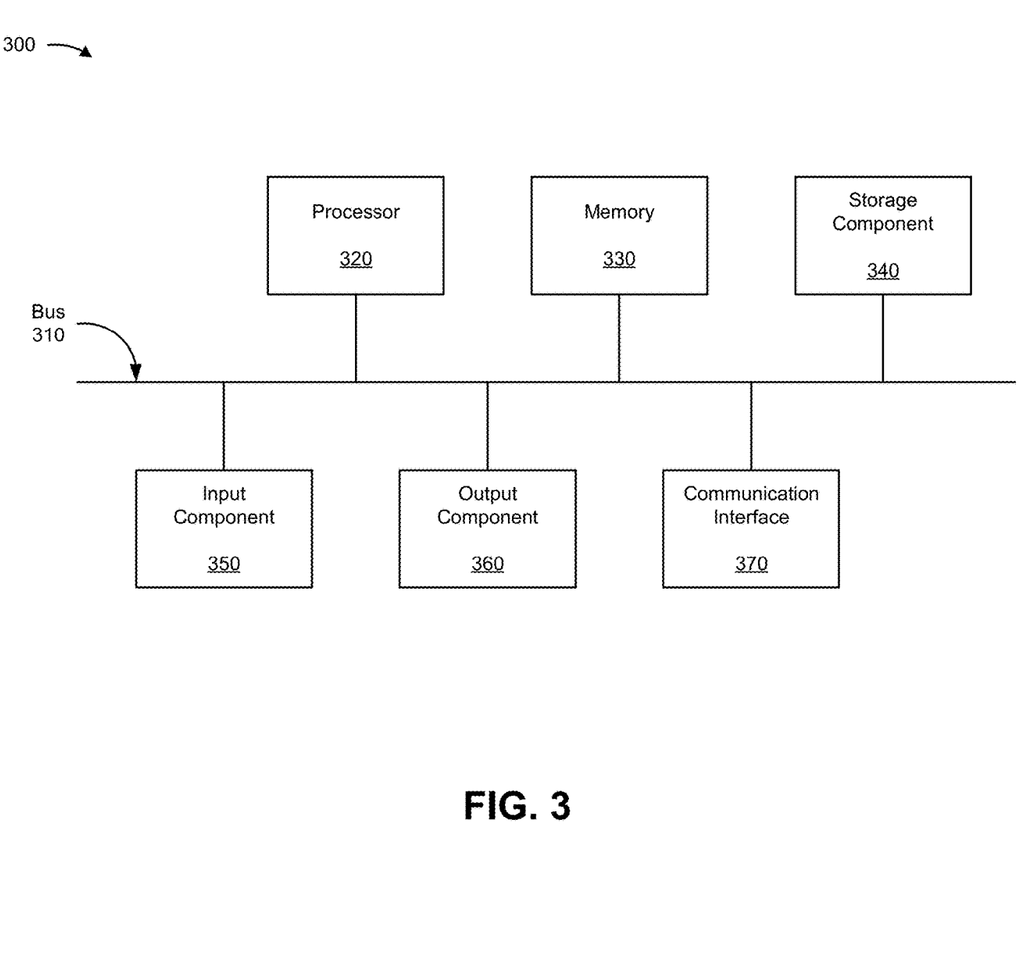
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, campaign enforcement device 230, campaign management device 235, AAA 240, campaign input device 245, and/or content provider device 250. In some implementations, mobile device 205, base station 210, MME 215, SGW 220, PGW 225, campaign enforcement device 230, campaign management device 235, AAA 240, campaign input device 245, and/or content provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
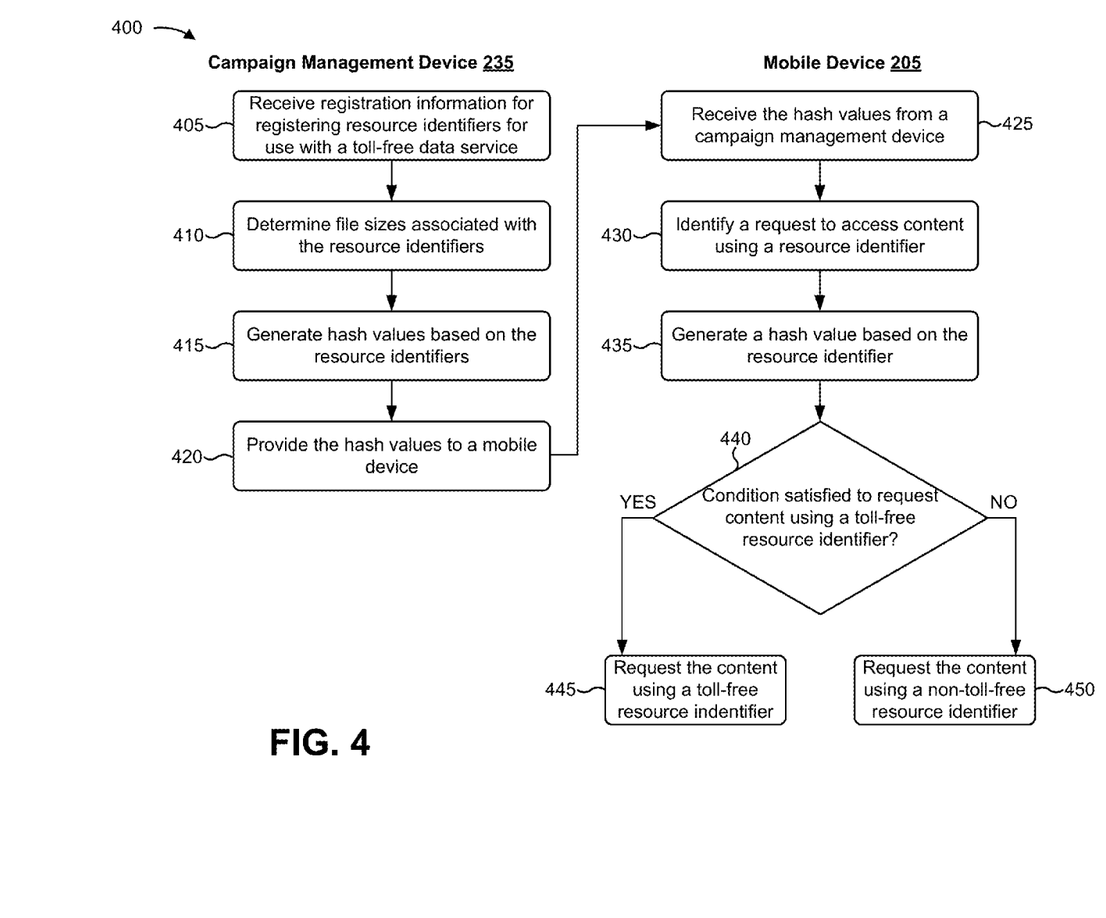
FIG. 4 is a flow chart of an example process for requesting toll-free content based on a file size.

FIG. 4 is a flow chart of an example process 400 for requesting toll-free content based on a file size. In some implementations, one or more process blocks of FIG. 4 may be performed by campaign management device 235 and/or mobile device 205. In some implementations, one or more process blocks of FIG. 4 may be performed by another device or a group of devices separate from or including campaign management device 235 and/or mobile device 205, such as base station 210, MME 215, SGW 220, PGW 225, campaign enforcement device 230, AAA 240, campaign input device 245, and/or content provider device 250.

As shown in FIG. 4, process 400 may include receiving registration information for registering resource identifiers for use with a toll-free data service (block 405). For example, campaign management device 235 may receive, from campaign input device 245 via network 255, information for registering resource identifiers for use with a toll-free data service. A resource identifier may be a string of characters used to identify a name or location of a resource in which such identification enables interactions with representations of the resource over a network. For example, a resource identifier may be a uniform resource identifier (URI), a uniform resource locator (URL), a uniform resource name (URN), the like. The registration information for registering the resource identifiers may be generated, for example, from a registration process available to a content provider using campaign input device 245.

In some implementations, a resource identifier may be associated with a particular type of content (e.g., streaming media content (e.g., video or audio), a webpage, a document, an image, or the like). Additionally, or alternatively, a resource identifier may be associated with a particular file (e.g., a portion of streaming media content, a portion of a webpage, or the like). Additionally, or alternatively, a resource identifier may be associated with a particular type of file (e.g., a hypertext markup language (HTML) file, an extensible markup language file (XML), a joint photographic experts group (JPEG) file, a transport stream (TS) file, or the like). Additionally, or alternatively, a resource identifier may be associated with a file having a particular file size (e.g., a particular quantity of bytes).

In some implementations, the resource identifier may be associated with a toll-free data service. A toll-free data service may correspond to providing content (e.g., streaming media content (e.g., video or audio), a webpage, an image, a file, or the like) that the content provider wishes to provide to mobile device 205 for free by subsidizing the cost of network data usage associated with receiving the content. In some implementations, a toll-free data campaign may refer to a campaign by a content provider where the content provider agrees to be charged for data usage by users of mobile devices 205 that access the content provided by the content provider.

In some implementations, registration information may include information that identifies a content provider associated with a campaign, information that identifies one or more content provider devices 250 that provide content associated with a campaign, information that identifies an amount of data (e.g., in bytes) that the content provider will pay for during the campaign, information that identifies a start and an end of the campaign, etc. In some implementations, an employee associated with the content provider may input campaign information using campaign input device 245, and campaign input device 245 may provide the campaign information to campaign management device 235. In this way, campaign management device 235 may receive one or more resource identifiers that may be used to access toll-free content.

As further shown in FIG. 4, process 400 may include determining file sizes associated with the resource identifiers (block 410). For example, campaign management device 235 may determine file sizes associated with the resource identifiers. In some implementations, campaign management device 235 may receive information, from campaign input device 245, identifying resource identifiers via which a toll-free data service may be accessed for the campaign.

In some implementations, campaign management device 235 may determine file sizes associated with the resource identifiers (e.g., a quantity of bytes). For example, campaign management device 235 may receive information identifying one or more locations of files associated with the resource identifiers (e.g., associated with a storage component of one or more content provider devices 250). In some implementations, campaign management device 235 may analyze (e.g., scan) content provider device 250 (e.g., a storage component associated with content provider device 250) to determine file sizes associated with the resource identifiers. In some implementations, campaign management device 235 may send a request to content provider device 250 to determine file sizes associated with the resource identifiers.

In some implementations, campaign management device 235 may determine a particular file size of a file associated with a resource identifier (e.g., may determine that the file size is 4 MB, 10 MB, 1 GB, or the like). Additionally, or alternatively, campaign management device 235 may determine a range of file sizes that a file associated with a resource identifier falls within (e.g., 0-5 MB, 100-250 MB, or the like). Additionally, or alternatively, campaign management device 235 may determine a file size by aggregating file sizes associated with multiple resource identifiers.

For example, campaign management device 235 may determine that a particular file may belong to a larger group of files (e.g., may belong to a media stream, or the like). In some implementations, campaign management device 235 may determine that a particular file may belong to a larger group of files by determining a common sequence of characters (e.g., a portion of a resource identifier) that each file (e.g., files belonging to the larger group of files) shares. In this way, campaign management device 235 may determine that a set of files, when aggregated, may satisfy the file size threshold, as described in more detail elsewhere herein.

In some implementations, campaign management device 235 may store information identifying the resource identifiers and file sizes associated with the resource identifiers (e.g., in a data structure). In this way, campaign management device 235 may use the stored information to generate hash values based on the resource identifiers and may provide the generated hash values to mobile device 205, as described below.

As further shown in FIG. 4, process 400 may include generating hash values based on the resource identifiers (block 415). For example, campaign management device 235 may generate hash values based on the resource identifiers. In some implementations, campaign management device 235 may generate hash values by applying a hash algorithm (e.g., SHA-1, SHA-2, MD4, MD5, etc.) to the resource identifiers. For example, campaign management device 235 may hash a resource identifier.

In some implementations, campaign management device 235 may generate a hash value for each resource identifier. For example, campaign management device 235 may generate a hash value for each resource identifier (e.g., each resource identifier stored in a data structure associated with campaign management device 235).

In some implementations, campaign management device 235 may generate a hash value for each resource identifier that is associated with a file that satisfies a file size threshold. For example, campaign management device 235 may identify resource identifiers that are associated with files that satisfy the file size threshold and may generate hash values. Additionally, or alternatively, campaign management device 235 may not generate hash values for resource identifiers that are associated with files that do not satisfy the file size threshold.

In some implementations, the file size threshold may include a particular file size (e.g., 5 MB, 25 MB, 1 GB, or the like). Additionally, or alternatively, the file size threshold may include a range of file sizes (e.g., 5-10 MB, 100-200 MB, or the like).

In some implementations, campaign management device 235 may receive, from mobile device 205, information identifying the file size threshold. For example, mobile device 205 may receive (e.g., a user may interact with a user interface of mobile device 205) information identifying a file size threshold that may be used to request toll-free content. Additionally, or alternatively, campaign device 235 may receive information identifying a file size threshold (e.g., may be configured with the file size threshold). Additionally, or alternatively, campaign device 235 may receive, from another device (e.g., a network operator may specify a file size threshold), information identifying a file size threshold. In this way, network resources may be conserved by reducing the quantity of toll-free resource identifiers that may need to be generated and/or validated.

In some implementations, campaign management device 235 may generate hash values, by applying one or more hash algorithms to the resource identifiers, based on file sizes associated with the resource identifiers. For example, campaign management device 235 may apply a first hash algorithm to resource identifiers that are associated with files having file sizes that are within a first file size range (e.g., 0-5 MB), may apply a second hash algorithm to resource identifiers that are associated with files having file sizes that are within a second file size range (e.g., 5-10 MB), etc. In this way, campaign management device 235 may provide mobile device 205 with a list of generated hash values and mobile device 205 may determine whether to request a toll-free resource identifier, as described in more detail elsewhere herein.

In some implementations, campaign management device 235 may generate hash values based on receiving registration information from campaign input device 245. Additionally, or alternatively, campaign management device 235 may generate hash values based on receiving a file size threshold from mobile device 205. Additionally, or alternatively, campaign management device 235 may generate hash values based on receiving a file size threshold from another device (e.g., a network operator may configure a file size threshold). In some implementations, campaign management device 235 may generate hash values without receiving a file size threshold from mobile device 205.

As further shown in FIG. 4, process 400 may include providing the hash values to mobile device 205 (block 420). For example, campaign management device 235 may provide the hash values to mobile device 205. In some implementations, campaign management device 235 may provide the hash values to mobile device 205 based on receiving campaign information (e.g., one or more resource identifiers) from campaign input device 245. Additionally, or alternatively, campaign management device 235 may provide the hash values to mobile device 205 based on receiving a file size threshold from mobile device 205.

In some implementations, campaign management device 235 may provide hash values for resource identifiers associated with files having file sizes that satisfy the file size threshold. For example, campaign management device 235 may receive, from mobile device 205, information identifying the file size threshold. Additionally, or alternatively, campaign management device 235 may receive, from another device, information identifying the file size threshold (e.g., a network operator may configure the file size threshold). Campaign management device 235 may receive the file size threshold and may determine (e.g., based on stored information) resource identifiers that are associated with files that satisfy the file size threshold, for example. In some implementations, campaign management device 235 may provide mobile device 205 with hash values for resource identifiers that are associated with files that satisfy the file size threshold. Additionally, or alternatively, campaign management device 235 may provide mobile device 205 with hash values for resource identifiers that are associated with files that do not satisfy the file size threshold.

Additionally, or alternatively, campaign management device 235 may not provide hash values for resource identifiers that are associated with files that do not satisfy the file size threshold. In this way, campaign management device 235 may provide mobile device 205 with the generated hash values and mobile device 205 may determine whether to request toll-free resource identifiers based on matching the generated hash values, as described in more detail elsewhere herein.

In some implementations, campaign management device 235 may provide mobile device 205 with information identifying file sizes associated with the hash values. In this way, mobile device 205 may receive hash values from campaign management device 235 and may determine whether to request toll-free resource identifiers based on the hash values and/or the file sizes associated with the hash values, as described in more detail elsewhere herein.

As further shown in FIG. 4, process 400 may include receiving the hash values from campaign management device 235 (block 425). For example, mobile device 205 may receive the hash values from campaign management device 235. In some implementations, mobile device 205 may receive the hash values from campaign management device 235 based on an interval (e.g., a time frame). Additionally, or alternatively, mobile device 205 may receive the hash values from campaign management device 235 based on campaign management device 235 generating the hash values. Additionally, or alternatively, mobile device 205 may receive the hash values from campaign management device 235 based on providing a file size threshold to campaign management device 235.

In some implementations, mobile device 205 may receive hash values associated with resource identifiers that are associated with file sizes that satisfy the file size threshold. Additionally, or alternatively, mobile device 205 may receive hash values associated with each resource identifier stored by campaign management device 235 (e.g., each resource identifier provided by campaign input device 245).

In some implementations, mobile device 205 may store the hash values (e.g., in a data structure). In this way, mobile device 205 may identify a request to access content using a resource identifier and may generate a hash value based on the resource identifier. Mobile device 205 may then compare the generated hash value with stored hash values, as described in more detail elsewhere herein.

As further shown in FIG. 4, process 400 may include identifying a request to access content using a resource identifier (block 430). For example, mobile device 205 may identify a request to access content using a resource identifier. In some implementations, the request to access content may include, for example, an HTTP request, a packet, a session request, or the like. In some implementations, mobile device 205 may identify a request to access content based on an action of a user associated with mobile device 205 (e.g., based on a user interaction with a user interface of mobile device 205). For example, mobile device 205 may identify a request to access content using a resource identifier when the user clicks on the resource identifier (e.g., a URL).

In some implementations, a request to access content using a resource identifier may be associated with an application. For example, the application may permit a user of mobile device 205 to access content, such as a webpage, an image, streaming media, or the like. In some implementations, the application may cause mobile device 205 to transmit a request to access content using a resource identifier. In some implementations, mobile device 205 may identify a request to access content using a resource identifier based on a user interaction with the application (e.g., executing the application, etc.).

As further shown in FIG. 4, process 400 may include generating a hash value based on the resource identifier (block 435). For example, mobile device 205 may generate a hash value based on the resource identifier. In some implementations, mobile device 205 may generate a hash value by applying a hash algorithm to the resource identifier. For example, mobile device 205 may hash the resource identifier. Additionally, or alternatively, mobile device 205 may hash the resource identifier and another value together. In some implementations, mobile device 205 may apply a hash algorithm to the resource identifier that is the same as a hash algorithm applied by campaign management device 235.

In some implementations, mobile device 205 may apply an algorithm based on the file size threshold. For example, mobile device 205 may identify the file size threshold (e.g., based on a user input specifying the file size threshold). Based on the file size threshold, mobile device 205 may apply a particular algorithm (e.g., apply a first algorithm for file sizes between 0-5 MB, apply a second algorithm for file sizes between 5-10 MB, etc.).

In this way, mobile device 205 may generate a hash value based on the resource identifier and may compare the generated hash value with a stored (e.g., received from campaign management device 235) hash value (or values), as described in more detail elsewhere herein.

As further shown in FIG. 4, process 400 may include determining, based on the hash value and the received hash values, whether a condition is satisfied to request the content using a toll-free resource identifier (block 440). For example, mobile device 205 may determine, based on the hash value and the received hash values, whether a condition is satisfied to request the content using a toll-free resource identifier.

In some implementations, mobile device 205 may determine whether the condition is satisfied based on comparing the hash value with the received hash values. For example, mobile device 205 may compare the hash value with the received hash values and may identify a match (e.g., the hash value may include the same value as a received hash value). In some implementations, a match between the hash value and a received hash value may indicate that a file associated with the resource identifier satisfies the file size threshold.

In some implementations, the received hash values may indicate resource identifiers that are associated with files having file sizes that satisfy the file size threshold. For example, as described above, campaign management device 235 may determine file sizes associated with the resource identifiers and may provide mobile device 205 with hash values associated with resource identifiers that satisfy the file size threshold. In this way, each received hash value may represent a resource identifier associated with a file having a file size that satisfies the file size threshold. Mobile device 205 may identify a match between the hash value and a received hash value and may determine that the condition is satisfied based on identifying the match, for example.

In some implementations, the received hash values may be associated with files having file sizes that may or may not satisfy the file size threshold. For example, as described above, campaign management device 235 may generate hash values based on applying particular algorithms based on the file sizes associated with the resource identifiers. For example, campaign management device 235 may apply a first algorithm to resource identifiers having file sizes within a first file size range (e.g., 0-5 MB), may apply a second algorithm to resource identifiers having file sizes within a second file size range (e.g., 5-10 MB), etc.

In some implementations, mobile device 205 may apply a same algorithm as campaign management device 235 based on the file size threshold. For example, if the file size threshold includes a first file size range (e.g., 0-5 MB), then mobile device 205 may apply the first algorithm, etc. Further, if the file size threshold is changed (e.g., via a user interaction with a user interface of mobile device 205), then mobile device 205 may apply a different algorithm to generate the hash value, and may compare the hash value with the received hash values. In this way, mobile device 205 may identify a match between the hash value and a received hash value and may determine that the condition is satisfied, for example.

In some implementations, mobile device 205 may determine whether the condition is satisfied based on comparing the hash value with the received hash values and based on determining whether a file size satisfies the file size threshold. For example, as described above, campaign management device 235 may provide mobile device 205 with hash values and may provide mobile device 235 with file sizes corresponding to the hash values.

Mobile device 205 may determine a match between the hash value (e.g., the hash value generated by mobile device 205) and a received hash value, and may determine that the file size corresponding to the received hash value satisfies the file size threshold. Further, mobile device 205 may determine that the condition is satisfied based on the identified match and based on the file size satisfying the file size threshold, for example.

In some implementations, mobile device 205 may determine that the condition is satisfied based on aggregating multiple resource identifiers (e.g., aggregating file sizes). For example, a particular portion (e.g., file) of a media stream may include a file size that does not satisfy the file size threshold. However, when aggregated, files belonging to the media stream may satisfy the file size threshold. Thus, in some implementations, mobile device 205 may identify (e.g., based on a common sequence of characters in resource identifiers) that one or more resource identifiers belong to a particular group, and may aggregate file sizes associated with the resource identifiers. In this way, mobile device 205 may request one or more toll-free resource identifiers associated with the content. Additionally, or alternatively, mobile device 205 may request toll-free resource identifiers for particular files associated with a content type (e.g., streaming media) or a particular file type (e.g., transport stream files, etc.).

In this way, mobile device 205 may determine whether the condition is satisfied to request the content using a toll-free resource identifier and may either request the content using a toll-free resource identifier or a non-toll-free resource identifier, as described below.

As further shown in FIG. 4, if the condition is satisfied (block 440—YES), then process 400 may include requesting the content using a toll-free resource identifier (block 445). For example, if mobile device 205 determines that the condition is satisfied, then mobile device 205 may request the content using a toll-free resource identifier. For example, mobile device 205 may request another device (e.g., campaign enforcement device 230) to convert the resource identifier to a toll-free resource identifier.

In some implementations, campaign enforcement device 230 may receive the resource identifier from mobile device 205 and may generate a toll-free resource identifier (e.g., by adding a signature, such as a character string, to the resource identifier, by replacing the resource identifier with a toll-free resource identifier, etc.). Mobile device 205 may receive the toll-free resource identifier from campaign enforcement device 230, and may request the content using the toll-free resource identifier, for example.

In this way, mobile device 205 may request toll-free resource identifiers for files having file sizes that satisfy the file size threshold and/or that are eligible to be provided via a toll-free data service. Further, data usage incurred by accessing the content may be allocated to the content provider rather than a user of mobile device 205, for example.

As further shown in FIG. 4, if the condition is not satisfied (block 440—NO), then process 400 may include requesting the content using a non-toll-free resource identifier (block 450). For example, if mobile device 205 determines that the condition is not satisfied, then mobile device 205 may request the content using a non-toll-free resource identifier.

For example, mobile device 205 may provide a request (e.g., an HTTP request) for the content using a non-toll-free resource identifier. By determining that the condition is not satisfied, mobile device 205 may determine that the file size associated with the resource identifier does not satisfy the file size threshold. By using a non-toll-free resource identifier to request the content, a user associated with mobile device 205 may be charged for data usage incurred based on accessing the content. However, a rate of content delivery may be increased based on bypassing the resource identifier generation and/or validation processes (e.g., generating and/or validating a toll-free resource identifier). Additionally, network, processor, and/or memory resources may be conserved based on not generating a toll-free resource identifier for a file that does not satisfy the file size threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may conserve network, processor, and/or memory resources by reducing a quantity of toll-free resource identifiers that need to be generated and/or validated for use with a toll-free data service. Additionally, implementations described herein may improve a rate of content delivery to a mobile device by using non-toll-free resource identifiers to request content that does not satisfy a file size threshold.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 one or more memories; and
 one or more processors, communicatively coupled to the one or more memories, to:
  provide a first user interface,
   the first user interface allowing a file size threshold for requesting a toll-free resource identifier to be specified,
   the device to request a toll-free resource using a non-toll-free resource identifier when a file size of the toll-free resource does not meet the file size threshold;
  receive a plurality of first hash values generated based on a plurality of first resource identifiers,
   the plurality of first resource identifiers providing access to a toll-free data service,
   the plurality of first resource identifiers being associated with the file size threshold specified via the first user interface for accessing the toll-free data service;
  identify a request to access content using a second resource identifier, the second resource identifier being provided on a second user interface of the device, the request being identified based on a user interaction via the second user interface of the device;

generate a second hash value based on the second resource identifier;

compare the second hash value and the plurality of first hash values; and request the content selectively using a toll-free resource identifier or a non-toll-free resource identifier based on comparing the second hash value and the plurality of first hash values, the content being requested using the toll-free resource identifier when the second hash value matches one of the plurality of first hash values, the toll-free resource identifier being received from another device based on providing the second resource identifier to the other device when the second hash value matches one of the plurality of first hash values, or the content being requested using the non-toll-free resource identifier when the second hash value does not match one of the plurality of first hash values thereby reducing a quantity of toll-free resource identifiers to be generated.

2. The device of claim 1, where the one or more processors are further to:

provide the file size threshold to another device; and where the one or more processors, when receiving the plurality of first hash values generated based on the plurality of first resource identifiers, are to:

receive the plurality of first hash values based on providing the file size threshold to the other device.

3. The device of claim 1, where the one or more processors are further to:

receive information identifying the file size threshold;

determine an algorithm to apply to the second resource identifier based on receiving the information identifying the file size threshold; and where the one or more processors, when generating the second hash value based on the second resource identifier, are to:

generate the second hash value by applying the algorithm to the second resource identifier.

4. The device of claim 1, where the one or more processors are further to:

receive a plurality of file sizes corresponding to the plurality of first hash values;

identify a match between the second hash value and one of the plurality of first hash values;

determine that a file size associated with the second hash value satisfies the file size threshold after identifying the match between the second hash value and the one of the plurality of first hash values; and where the one or more processors, when requesting the content selectively using the toll-free resource identifier or the non-toll-free resource identifier, are to:

request the content using the toll-free resource identifier based on determining that the file size associated with the second hash value satisfies the file size threshold.

5. The device of claim 1, where the second hash value is generated by applying a hash algorithm to the second resource identifier.

6. A non-transitory computer-readable medium storing instructions, the instructions comprising:

one or more instructions that, when executed by one or more processors of a device, cause the one or more processors to:

provide a first user interface, the first user interface allowing a file size threshold for requesting a toll-free resource identifier to be specified, the device to request a toll-free resource using a non-toll-free resource identifier when a file size of the toll-free resource does not meet the file size threshold;

receive a first hash value generated based on a resource identifier, the resource identifier being associated with a toll-free data service, the resource identifier being associated with the file size threshold specified via the first user interface for accessing the toll-free data service;

identify a request to access content using the resource identifier, the resource identifier being provided on a second user interface of the device, the request being identified based on a user interaction via the second user interface of the device;

generate a second hash value based on the resource identifier;

compare the first hash value and the second hash value; and request the content selectively using a toll-free resource identifier or a non-toll-free resource identifier based on comparing the first hash value and the second hash value, the content being requested using the toll-free resource identifier when the second hash value matches the first hash value, the toll-free resource identifier being received from another device based on providing the resource identifier to the other device when the second hash value matches the first hash value, or the content being requested using the non-toll-free resource identifier when the second hash value does not match the first hash value thereby reducing a quantity of toll-free resource identifiers to be generated.

7. The non-transitory computer-readable medium of claim 6, where the non-toll-free resource identifier is the resource identifier.

8. The non-transitory computer-readable medium of claim 6, where the one or more instructions, when executed by the one or more processors, further cause the one or more processors to:

provide the file size threshold to another device; and where the one or more instructions, that cause the one or more processors to receive the first hash value, cause the one or more processors to:

receive the first hash value based on providing the file size threshold to the other device.

9. The non-transitory computer-readable medium of claim 6, where the one or more instructions, when executed by the one or more processors, further cause the one or more processors to:

receive information identifying the file size threshold;

determine an algorithm to apply to the resource identifier based on receiving information identifying the file size threshold; and where the one or more instructions, that cause the one or more processors to generate the second hash value, cause the one or more processors to:
generate the second hash value by applying the algorithm to the resource identifier.

10. The non-transitory computer-readable medium of claim 6, where the one or more instructions, when executed by the one or more processors, further cause the one or more processors to:
receive information identifying a file size corresponding to the first hash value;
identify a match between the first hash value and the second hash value;
determine that the file size corresponding to the first hash value satisfies the file size threshold after identifying the match between the first hash value and the second hash value; and
where the one or more instructions, that cause the one or more processors to request the content selectively using the toll-free resource identifier or the non-toll-free resource identifier, cause the one or more processors to:
request the content using the toll-free resource identifier based on determining that the file size associated with the first hash value satisfies the file size threshold.

11. The non-transitory computer-readable medium of claim 6, where the first hash value is generated based on applying a hash algorithm to the resource identifier.

12. A method, comprising:
providing, by a device, a first user interface,
the first user interface allowing a file size threshold for requesting a toll-free resource identifier to be specified,
the device to request a toll-free resource using a non-toll-free resource identifier when a file size of the toll-free resource does not meet the file size threshold;
receiving, by the device, a plurality of first hash values generated based on a plurality of first resource identifiers,
the plurality of first resource identifiers providing access to a toll-free data service,
the plurality of first resource identifiers being associated with the file size threshold specified via the first user interface for accessing the toll-free data service;
identifying, by the device, a request to access content using a second resource identifier,
the second resource identifier being provided on a second user interface of the device,
the request being identified based on a user interaction via the second user interface of the device;
generating, by the device, a second hash value based on the second resource identifier;
comparing, by the device, the second hash value and the plurality of first hash values; and
requesting, by the device, the content selectively using a toll-free resource identifier or a non-toll-free resource identifier based on comparing the second hash value and the plurality of first hash values,
the content being requested using the toll-free resource identifier when the second hash value matches one of the plurality of first hash values,
the toll-free resource identifier being received from another device based on providing the second resource identifier to the other device when the second hash value matches one of the plurality of first hash values, or
the content being requested using the non-toll-free resource identifier when the second hash value does not match one of the plurality of first hash values thereby reducing a quantity of toll-free resource identifiers to be generated.

13. The method of claim 12, further comprising:
providing the file size threshold to another device; and
where receiving the plurality of first hash values generated based on the plurality of first resource identifiers comprises:
receiving the plurality of first hash values based on providing the file size threshold to the other device.

14. The method of claim 12, further comprising:
receiving information identifying the file size threshold;
determining an algorithm to apply to the second resource identifier based on receiving the information identifying the file size threshold; and
where generating the second hash value based on the second resource identifier comprises:
generating the second hash value by applying the algorithm to the second resource identifier.

15. The method of claim 12, further comprising:
receiving a plurality of file sizes corresponding to the plurality of first hash values;
identifying a match between the second hash value and one of the plurality of first hash values;
determining that a file size associated with the second hash value satisfies the file size threshold after identifying the match between the second hash value and the one of the plurality of first hash values; and
where requesting the content selectively using the toll-free resource identifier or the non-toll-free resource identifier comprises:
requesting the content using the toll-free resource identifier based on determining that the file size associated with the second hash value satisfies the file size threshold.

16. The device of claim 1, where the request to access the content is associated with an application,
the application being executed when requesting the content using the toll-free resource identifier.

17. The non-transitory computer-readable medium of claim 6, where the request to access the content is associated with an application,
the application being executed when requesting the content using the toll-free resource identifier.

18. The method of claim 12, where the request to access the content is associated with an application,
the application being executed when requesting the content using the toll-free resource identifier.

19. The device of claim 1, where the one or more processors are further to:
receive registration information associated with registering the plurality of first resource identifiers; and
generate, based on receiving the registration information, the first hash values.

20. The method of claim 12, further comprising:
receiving registration information associated with registering the plurality of first resource identifiers; and
generating, based on receiving the registration information, the first hash values.

* * * * *